United States Patent
Morohoshi

(10) Patent No.: US 8,131,081 B2
(45) Date of Patent: Mar. 6, 2012

(54) IMAGE PROCESSING APPARATUS, AND COMPUTER PROGRAM PRODUCT

(75) Inventor: Hiroshi Morohoshi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1231 days.

(21) Appl. No.: 11/843,111

(22) Filed: Aug. 22, 2007

(65) Prior Publication Data

US 2008/0050019 A1   Feb. 28, 2008

(30) Foreign Application Priority Data

Aug. 22, 2006  (JP) ................................ 2006-225808

(51) Int. Cl.
*G06K 9/00* (2006.01)
(52) U.S. Cl. ........................................ 382/187; 382/190
(58) Field of Classification Search .................. 345/522; 382/187, 189, 190; 707/200, 999.001; 709/100
See application file for complete search history.

(56) References Cited

U.S. PATENT DOCUMENTS

| 7,257,567 | B2 * | 8/2007 | Toshima | ................................ 1/1 |
| 2002/0032714 | A1 * | 3/2002 | Monobe | ........................ 709/100 |
| 2006/0294154 | A1 * | 12/2006 | Shimizu | ........................ 707/200 |
| 2008/0050019 | A1 * | 2/2008 | Morohoshi | ................... 382/187 |

FOREIGN PATENT DOCUMENTS

| JP | 04-199388 | 7/1992 |
| JP | 06-004205 | 1/1994 |
| JP | 06-004671 | 1/1994 |

* cited by examiner

*Primary Examiner* — Gregory M Desire
(74) *Attorney, Agent, or Firm* — Harness, Dickey & Pierce, P.L.C.

(57) ABSTRACT

An image processing apparatus includes a command-data storage unit, a handwritten-data recognizing unit, and a matching unit. The command-data storage unit stores therein a command-data table that contains a command character and content of a command corresponding to the command character in an associated manner. The handwritten-data recognizing unit performs character recognition and image analysis on image data to extract handwritten information including a command graphic representing a command with respect to the image data and a command character handwritten near the command graphic. The matching unit matches the command character extracted by the handwritten-data recognizing unit with the command character in the command-data table.

9 Claims, 6 Drawing Sheets

FIG. 2

| COMMAND CHARACTER | COMMAND CONTENT |
|---|---|
| M | SAVE DATA |
| S | TRANSMIT DATA BY EMAIL |
| D | DISCARD DATA |
| ⋮ | ⋮ |

FIG. 3

| MANAGEMENT NUMBER | SAVING DESTINATION |
|---|---|
| 20050930-1 | FOLDER FOR ELECTRONIC PAPER 1 |
| 20050930-2 | FOLDER FOR ELECTRONIC PAPER 1 |
| 20060117-1 | FOLDER FOR ELECTRONIC PAPER 2 |
| 20060117-2 | FOLDER FOR ELECTRONIC PAPER 2 |
| 20060117-3 | FOLDER FOR ELECTRONIC PAPER 2 |
| ⋮ | ⋮ |

IMAGE PROCESSING APPARATUS, AND COMPUTER PROGRAM PRODUCT

CROSS-REFERENCE TO RELATED APPLICATIONS

The present application claims priority to and incorporates by reference the entire contents of Japanese priority document, 2006-225808 filed in Japan on Aug. 22, 2006.

BACKGROUND OF THE INVENTION

1. Field of the Invention

The present invention relates to a technology for recognizing a command in data to be processed.

2. Description of the Related Art

Generally, to convert characters, graphics, etc. handwritten on a document to electrical data, the document is read by a scanner to generate image data. In the case of text, the text is read as an image by a scanner. The image is analyzed through optical character recognition (OCR) process, and is thereby converted to text data. To carry out a desired process such as saving on the image data or the text data, a user provides input to specify the desired process. For example, when saving the text data, the user provides input to search a desired saving destination, and to specify a file at the saving destination to save the text data.

A conventional technology disclosed in Japanese Patent Laid-open Application No. H6-4205 enables to input, by handwriting, commands to search a file, specify the file, and save data in the file. In the conventional technology, a user uses a stylus pen to input a stroke of a handwritten character into a tablet. By calculating distances between all the coordinates from a start point to an end point of the stroke and a moving speed of the stylus pen, various commands are recognized and executed. Examples of an input tool other than stylus pen include a touch pad that is often provided in a compact mobile terminal and receives input by detecting pressure or using magnetism.

However, in the conventional technology, the tablet is used to provide input. Due to this, to save image data, etc. in an image processing apparatus having a scanner, a user is required to perform complex and tedious input operation for searching a file, specifying the file, and executing the desired process. Moreover, because the input tool such as a touch pad cannot be used with an existing image processing apparatus, a new apparatus needs to be installed.

SUMMARY OF THE INVENTION

It is an object of the present invention to at least partially solve the problems in the conventional technology.

According to an aspect of the present invention, an image processing apparatus includes a storage unit that stores therein an association table that contains a command character and content of a command corresponding to the command character in an associated manner, a recognizing unit that performs character recognition and image analysis on image data to extract handwritten information including a command graphic representing a command with respect to the image data and a command character handwritten near the command graphic, and a matching unit that matches the command character extracted by the recognizing unit with the command character in the association table.

According to another aspect of the present invention, an image processing apparatus includes a storage unit that stores therein an association table that contains a command character and content of a command corresponding to the command character in an associated manner, a character recognizing unit that performs first character recognition on image data, and a command extracting unit that performs image analysis on an image area in the image data where the first character recognition has failed, and extracts a command graphic representing a command with respect to the image data from handwritten information including the command graphic and a command character handwritten near the command graphic. The character recognizing unit performs second character recognition of an area near the command graphic to extract the command character from the handwritten information. The image processing apparatus further includes a matching unit that matches the command character extracted by the character recognizing unit with the command character in the association table.

A computer program product including a computer usable medium having computer readable program codes embodied in the medium that, when executed, causes a computer to execute storing an association table that contains a command character and content of a command corresponding to the command character in an associated manner, performing character recognition and image analysis on image data to extract handwritten information including a command graphic representing a command with respect to the image data and a command character handwritten near the command graphic, and matching the command character extracted at the performing with the command character in the association table.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of a command-data table stored in a command-data storage unit shown in FIG. 1;

FIG. 3 is an example of a management table stored in a management-data storage unit shown in FIG. 1;

DETAILED DESCRIPTION OF THE PREFERRED EMBODIMENTS

Exemplary embodiments of the present invention are explained in detail below with reference to the accompanying drawings. In the following, an image processing apparatus according to the embodiments is explained as being applied to a multifunction product (MFP) having functions as a scanner, a copier, a facsimile machine, a printer, etc. However, the present invention can similarly be applied to any device that includes an image-reading unit, such as a copier, a facsimile machine, a digital camera, a mobile phone, a scanner, and a camera, and that performs optical character recognition (OCR) process and image analyzing process.

A data management system according to an embodiment of the present invention includes an image processing apparatus, a file server, and a display device. The image processing apparatus extracts a handwritten command from a handwritten document, and transmits command data obtained from the handwritten command and image data of the document to the file server. The image data is processed according to the command data in the file server. The handwritten command includes a handwritten command graphic indicating a command on the image data, and a handwritten command character indicating a command content written in the vicinity of the command graphic.

Figure 1:
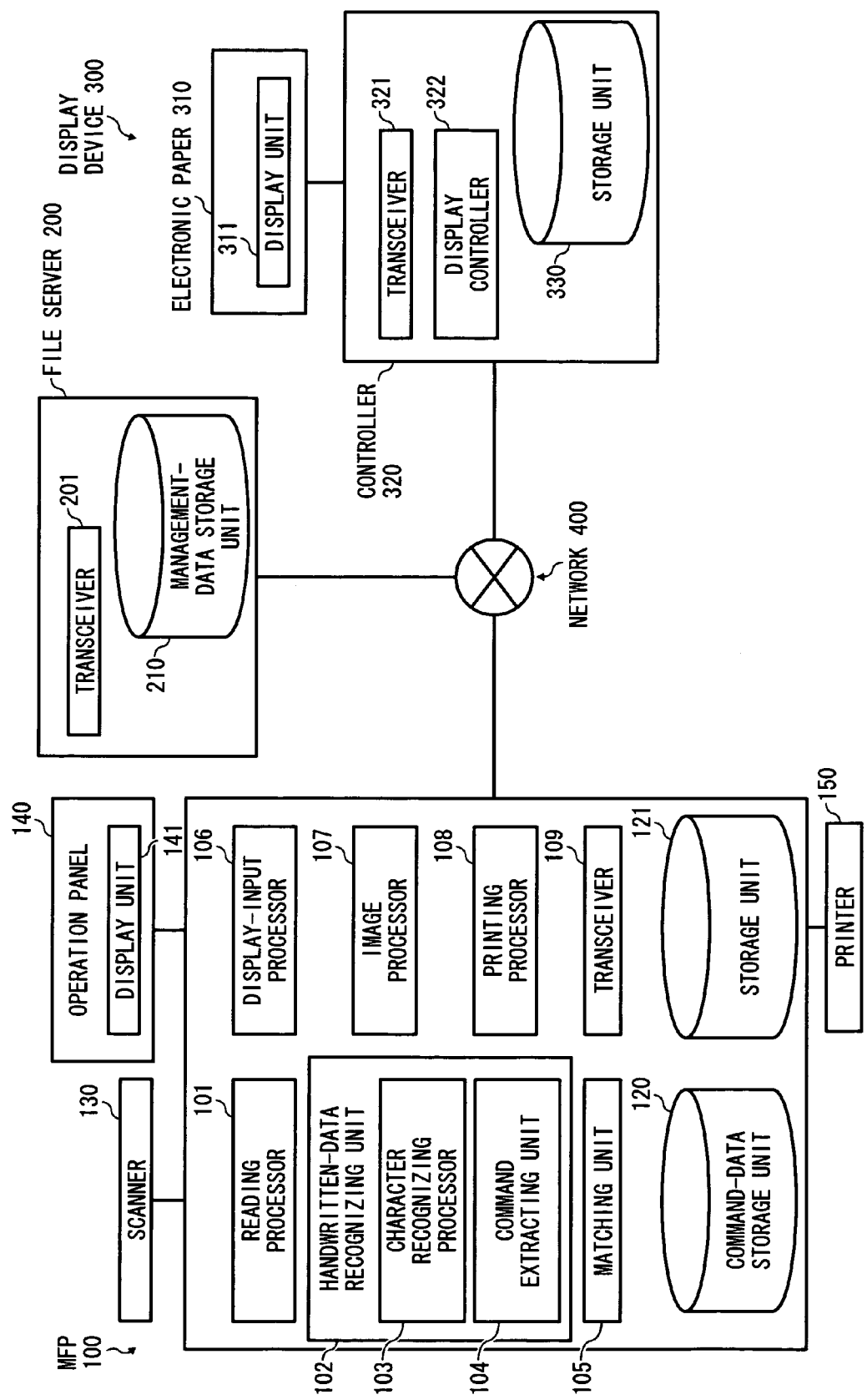
FIG. 1 is a block diagram of a data management system according to an embodiment of the present invention.
Figure 4:
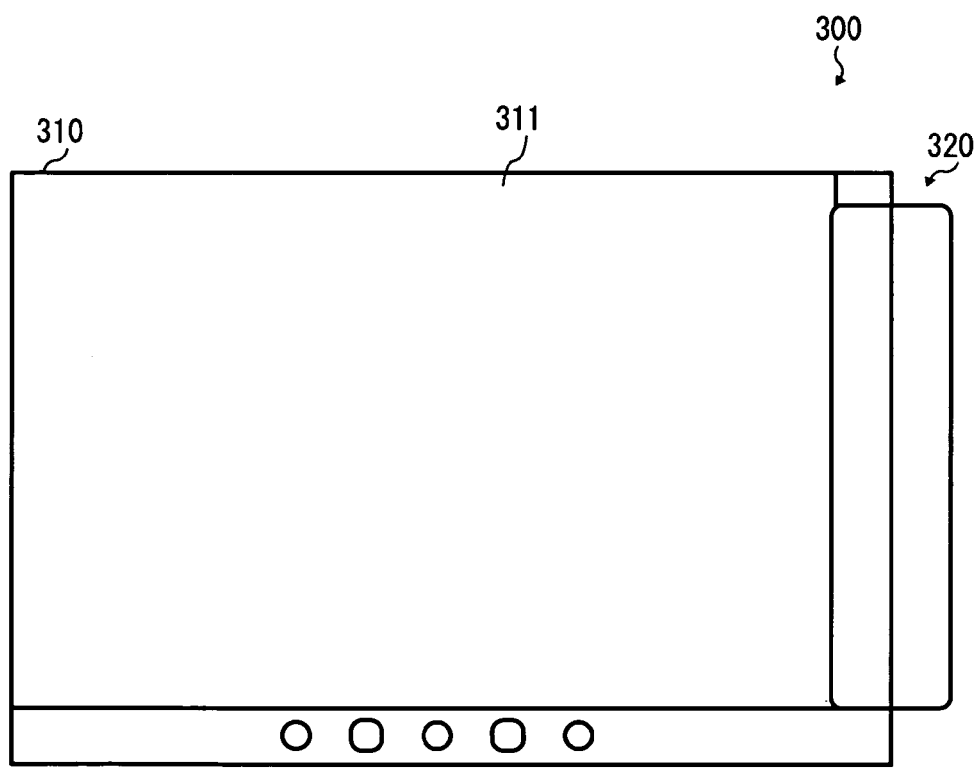
FIG. 4 is a schematic diagram of a display device shown in FIG. 1.

FIG. 1 is a block diagram of the data management system according to the embodiment. The data management system includes an MFP 100, a file server 200, and a display device 300, which are connected by a network 400 such as a wireless local area network (LAN).

The MFP 100 scans a document, generates image data from the document, and prints the image data. The MFP 100 includes an operation panel 140, a scanner 130, a printer 150, a command-data storage unit 120, a storage unit 121, a reading processor 101, a handwritten-data recognizing unit 102, a matching unit 105, a display-input processor 106, an image processor 107, a printing processor 108, and a transceiver 109.

The operation panel 140 includes a display unit 141 that can display various screens. Among the screens is an input screen on which are displayed operation keys (not shown). A user specifies settings or parameters for printing, etc. on the input screen.

The scanner 130 includes a charge-coupled device (CCD) to scan a document that includes handwritten data. The printer 150 prints, on a recording medium, image data for printing generated by the image processor 107.

The command-data storage unit 120 stores therein a command-data table that contains command content in association with command characters each indicating process to be performed on the image data in the MFP 100 or the file server 200. FIG. 2 is an example of the command-data table. As shown in FIG. 2, the command-data table stores therein command characters (M, S, D, etc.) and command contents (save data, transmit data by email, discard data, etc.) in an associated manner. For example, a command character "M" corresponds to command content "save data". In the following description, the command character "M" is referred to as a save-command character.

The storage unit 121 stores therein image data generated by the reading processor 101 and image data for printing generated by the image processor 107. The reading processor 101 controls scanning of a document by the scanner 130, and generates image data from the document.

The handwritten-data recognizing unit 102 carries out OCR process, i.e., optically recognizes characters, and image analyzing process on image data generated by the reading processor 101. With this, the handwritten-data recognizing unit 102 recognizes handwritten data, which includes a handwritten enclosing mark (command graphic) that indicates a command, a command character inside the enclosing mark, and a management number (identification information) in the vicinity of the enclosing mark that indicates a saving destination of the data. The handwritten-data recognizing unit 102 extracts the command character and the management number from the handwritten data.

The enclosing mark is a graphic that is handwritten by a user on a document and is in a nearly circular shape. The enclosing mark herein indicates a command for processing in the MFP 100 and the file server 200. The enclosing mark need neither be a perfect circle nor be completely closed. The enclosing mark is only required to circularly surround a command character.

The handwritten-data recognizing unit 102 includes a character recognizing processor 103, and a command extracting unit 104. A specific operation of the handwritten-data recognizing unit 102 is explained below.

The character recognizing processor 103 carries out the OCR process on image data generated by the reading processor 101. Further, the character recognizing processor 103 carries out the OCR process on the inside and in the vicinity of an enclosing mark extracted by the command extracting unit 104, character-recognizes a command character inside the enclosing mark and a management number in the vicinity of the enclosing mark, and acquires the character-recognized command character and management number.

The command extracting unit 104 carries out image analysis on pixels in the vicinity of a character-recognition failure area, i.e., an area where character recognition is impossible as a result of the OCR process by the character recognizing processor 103, and extracts the enclosing mark.

Thus, if a document includes a handwritten command including an enclosing mark and a command character written inside the enclosing mark, the handwritten command can be recognized through the processes performed by the character recognizing processor 103 and the command extracting unit 104 in the handwritten-data recognizing unit 102. For example, if a specific character is designated as a handwritten command and the specific character alone is written on a document, the specific character is character-recognized in the initial OCR process. Consequently, it cannot be determined whether the specific character is a handwritten command or merely a note. Similarly, if a specific enclosing mark is designated as a handwritten command and the specific enclosing mark alone is written on a document, the specific enclosing mark is likely to be character-recognized as the English letter "O" during the initial OCR process. It cannot be determined whether the enclosing mark is a handwritten command or merely a note. To avoid such problems, in the embodiment, after recognition from an enclosing mark that a command is handwritten on a document, a command character written inside the enclosing mark is acquired to obtain command content. Thus, both enclosing mark and command character are treated as a handwritten command, and recognized by the character recognizing processor 103 and the command extracting unit 104.

Such enclosing mark and command character can be used in various manners. For example, to save a portion of a document, a user can write, by handwriting, a graphic enclosing the portion and a simple symbol consisting of a line and circles resembling scissors in the vicinity of the portion. The character recognizing processor 103 and the command extracting unit 104 recognize, as handwritten commands, the graphic and the symbol written in the vicinity of the graphic. The character recognizing processor 103 and the command extracting unit 104 extract, by trimming, the portion enclosed by the graphic, and saves only the trimmed portion. With such simple symbol, a user can easily and intuitively perform various functions rather than remembering setting operation. Moreover, use of a handwritten command independent of language enhance universal design features.

The matching unit 105 matches a command character inside a enclosing mark extracted by the character recognizing processor 103 with a command character in the command-data table stored in the command-data storage unit 120.

The display-input processor 106 controls display screens on the display unit 141 of the operation panel 140 and receives input of setting information or parameters from a user.

The image processor 107 generates image data for printing by the printer 150 from image data of a document scanned and temporarily stored in the storage unit 121. The printing processor 108 controls the printer 150 to print image data for printing generated by the image processor 107.

If command character matching by the matching unit 105 is successful, the transceiver 109 transmits, to the file server 200, the command character, corresponding management number, and image data subjected to the OCR process.

The file server 200 receives data from the MFP 100 and carries out various processes. Further, in response to a request from the display device 300, the file server 200 transmits data stored therein to the display device 300. The file server 200 includes a management-data storage unit 210 and a transceiver 201.

Similarly to the command-data storage unit 120 of the MFP 100, the management-data storage unit 210 stores therein the command-data table (see FIG. 2). The management-data storage unit 210 also stores therein a management table that stores therein management number and saving destination in association with each other. The management number indicates a file for storing image data. FIG. 3 is an example of the management table stored in the management-data storage unit 210. As shown in FIG. 3, the management table contains management number (20050930-1, 20060117-1, etc.) and saving destination (folder for electronic paper 1, folder for electronic paper 2, etc.) in an associated manner. In other words, for example, data accompanied with management number 20050930-1 is stored in "folder for electronic paper 1". The management-data storage unit 210 stores therein image data subjected to the OCR process received via the transceiver 201 from the MFP 100.

The transceiver 201 receives, from the MFP 100, a command character, a management number, and image data subjected to the OCR process. Further, the transceiver 201 receives a request for image data from the display device 300, and, in response to the request, transmits to the display device 300 the image data stored in the management-data storage unit 210 and the management number of the image data.

The display device 300 is easily portable, and displays data received from the file server 200. The display device 300 includes electronic paper 310, which includes a display unit 311, and a controller 320.

The electronic paper 310 has a thickness of a few tenths of a millimeter and includes the display unit 311 capable of electrical display and deletion of data. The electronic paper 310 is a reflective-type liquid crystal display which is expected to realize "linking with digital data and rewritability" of a soft copy copied on a screen of a display unit and conservation of paper resources in addition to "visibility and portability" of a hard copy printed on a recording medium. The electronic paper 310 is also extremely thin and flexible unlike a commonly used image display device.

The controller 320 includes a storage unit 330, a transceiver 321, and a display controller 322. The storage unit 330 stores therein image data and a management number received by the transceiver 321 from the file server 200. The transceiver 321 transmits a request for image data to the file server 200, receives from the file server 200, the image data and the management number of the image data in response to the request, and stores the image data and the management number in the storage unit 330. The display controller 322 controls the display unit 311 of the electronic paper 310 to display image data and a management number received by the transceiver 321.

A data-management process performed by the data management system is explained next. A preconditioning process of the data-management process is explained before explanation of the data-management process. Only process related to command content "save data", among those shown in FIG. 2, is explained below as an example.

First, the transceiver 321 in the display device 300 transmits a request for image data to be displayed on the display unit 311 to the file server 200. The transceiver 201 of the file server 200 receives the request, retrieves the image data and the management number of the image data from the management-data storage unit 210, and transmits the image data and the management number to the display device 300.

Upon receiving the image data and the management number from the file server 200, the transceiver 321 stores the image data and the management number in the storage unit 330. The display controller 322 displays, on the display unit 311, the image data and the management number stored in the storage unit 330.

The electronic paper 310 is a thin display that is easily portable. Due to this, during a meeting etc., for example, materials necessary for the meeting can be received from the file server 200, and image data and a corresponding management number can be conveniently displayed in tune with the progress of the meeting. While viewing the image data and the management number displayed on the display unit 311, the user can take handwritten notes of necessary information related to the displayed image data on ordinary paper.

Figure 5:
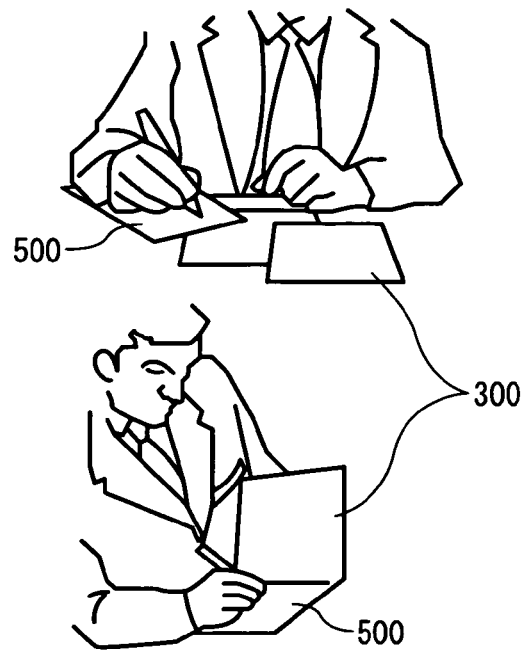
FIG. 5 is a schematic diagram for explaining an example in which a user is taking notes while viewing the display device.

FIG. 5 is a schematic diagram for explaining an example in which a user is taking notes while viewing the display device 300. In FIG. 5, the user takes notes on a document 500 while viewing image data and a management number displayed on the display device 300 placed on a table or on a left page.

Figure 6:
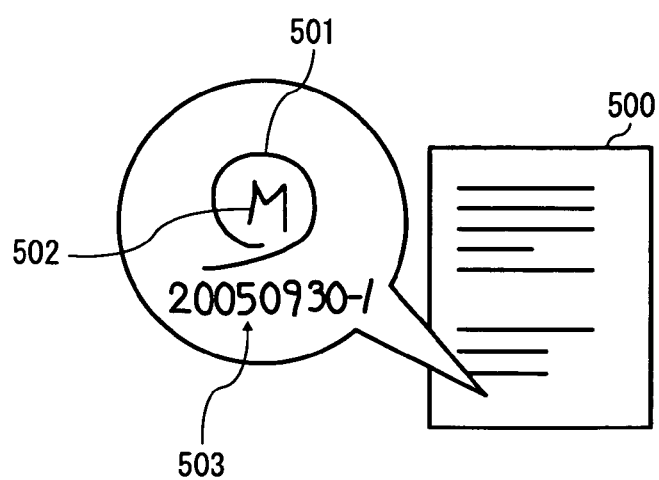
FIG. 6 is an example of a document on which an enclosing mark, a command character, and a management number are written.

For saving and managing the notes written on the document 500 together with the image data displayed on the display device 300, the user writes an enclosing mark at any location on the document 500 and writes the save-command character inside the enclosing mark and the management number of the saving destination in the vicinity of the enclosing mark. FIG. 6 is a schematic of an example of the document on which the enclosing mark, the save-command character, and the management number are written. As shown in FIG. 6, the notes are written on the document 500. Further, as shown in an enlarged view of the document 500, a nearly circular enclosing mark 501 is written at a location on the document 500, a save-command character (M) 502 is written inside the enclosing mark 501, and a management number (20050930-1) 503 is written in the vicinity of the enclosing mark 501. The user places, at a predetermined position of the MFP 100, the document 500 that includes the written enclosing mark 501, the save-command character (M) 502, and the management number 503.

Figure 7:
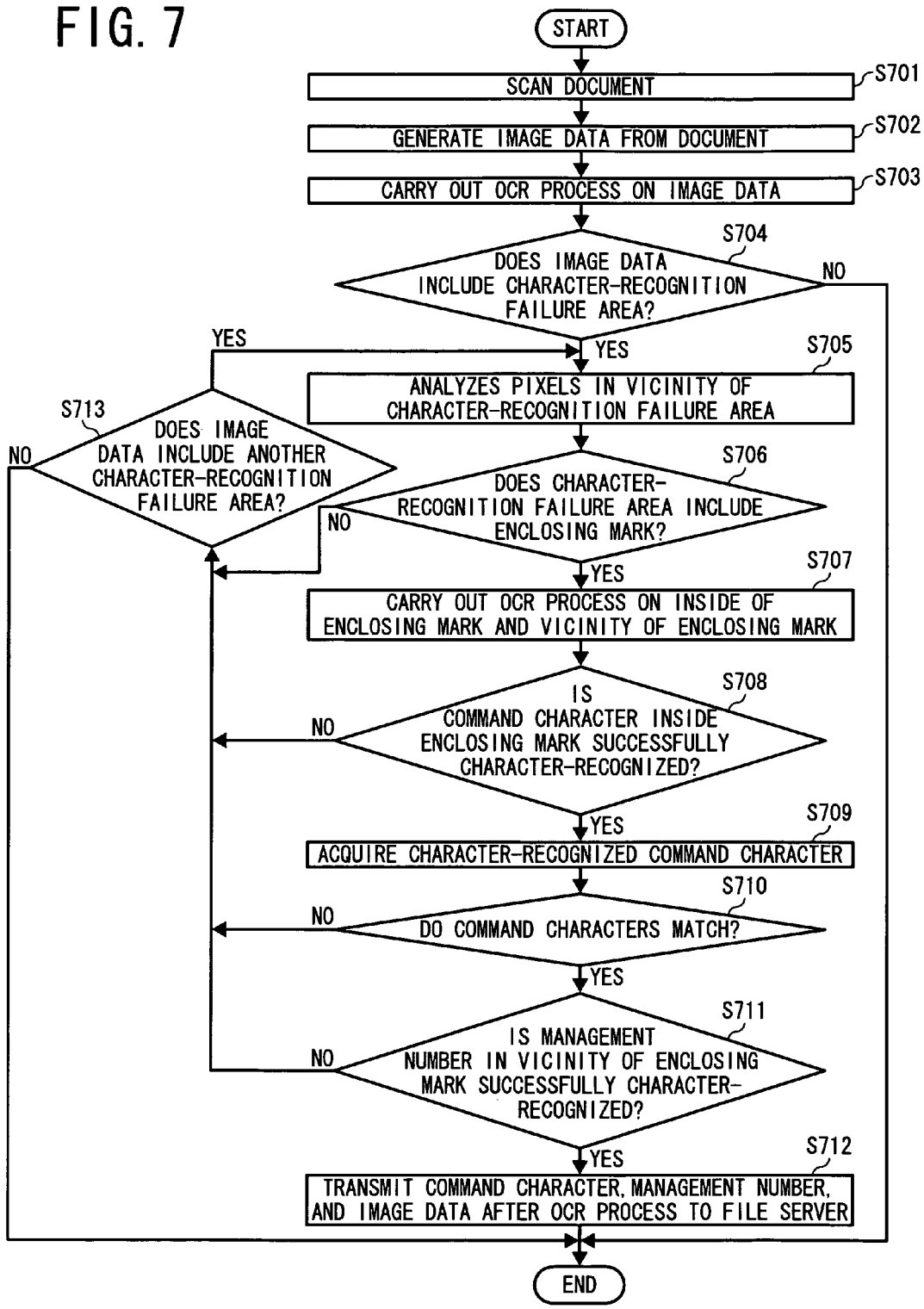
FIG. 7 is a flowchart of a data-management process performed by the data management system.

After the preconditioning process for the data-management process, the data management system carries out the data-management process. FIG. 7 is a flowchart of the data-management process performed by the data management system according.

Upon a user placing a document at a predetermined position, the scanner 130 scans the document (step S701). The reading processor 101 generates image data from the document scanned by the scanner 130 (step S702).

Next, the character recognizing processor 103 carries out the OCR process on the image data generated by the reading processor 101 (step S703). The character recognizing processor 103 determines whether the image data includes a character-recognition failure area in which character recognition cannot be carried out (step S704). If the image data does not include a character-recognition failure area (No at step S704), all characters, including the handwritten characters, are treated as character-recognized character data, and the process ends.

If the image data includes a character-recognition failure area (Yes at step S704), the command extracting unit 104 analyzes pixels in the vicinity of the character-recognition failure area (step S705), and determines whether the character-recognition failure area includes an enclosing mark (step S706). If the character-recognition failure area includes an enclosing mark (Yes at step S706), the command extracting unit 104 extracts the enclosing mark. This indicates that a command is written on the scanned document.

The character recognizing processor 103 carries out the OCR process on the inside and in the vicinity of the enclosing mark extracted by the command extracting unit 104 (step S707). The character recognizing processor 103 determines whether a command character inside the enclosing mark is successfully character-recognized (step S708). If the command character is successfully character-recognized (Yes at step S708), the character recognizing processor 103 acquires the character-recognized command character (step S709).

Next, the matching unit 105 compares the command character character-recognized by the character recognizing processor 103 with a command character stored in the command-data storage unit 120, and determines whether the command characters match (step S710). If the command characters match (Yes at step S710), the character recognizing processor 103 determines whether a management number in the vicinity of the enclosing mark is successfully character-recognized (step S711).

If the management number in the vicinity of the enclosing mark is successfully character-recognized (Yes at step S711), the transceiver 109 transmits, to the file server 200, the save-command character, the management number, and the image data subjected to the OCR process (step S712).

Returning to step S706, if the character-recognition failure area subjected to the image analysis does not include an enclosing mark (No at step S706), if the command character inside the enclosing mark is not successfully character-recognized (No at step S708), if the character-recognized command character is not the save-command character from a result of the matching by the matching unit 105 (No at step S710), or if a management number in the vicinity of the enclosing mark is not successfully character-recognized (No at step S711), it means that complete set of data related to the save command of the image data is not written in the character-recognition failure area. Accordingly, the character recognizing processor 103 checks whether the image data includes another character-recognition failure area (step S713).

If the image data includes another character-recognition failure area (Yes at step S713), the process from step S705 is repeated again. If the image data does not include another character-recognition failure area (No at step S713), thus indicating that the image data does not include a save-command character for the image data, the data management system ends the data-management process.

The transceiver 201 receives the save-command character, the management number, and the image data subjected to the OCR process transmitted to the file server 200 from the transceiver 109 at step S712. Referring to the command-data table stored in the management-data storage unit 210, the transceiver 201 acquires the command content of the received save-command character, and saves the received image data in the saving destination with the received management number. Thus, data of the same management number can be managed.

Thus, the MFP 100 scans a document placed at a predetermined position and carries out the OCR process and the image analyzing process on image data of the document to extract a handwritten command that includes an enclosing mark, a save-command character inside the enclosing mark, and a management number in the vicinity of the enclosing mark. The MFP 100 transmits, to the file server 200, the save-command character, the management number, and the image data subjected to the OCR process. According to the save-command character, the file server 200 saves the image data in a file based on the management number.

Due to this, image data such as characters, graphics, etc. handwritten on a document can be easily saved in a file with a management number of a desired saving destination, i.e., a management number displayed on the display device 300, in the file server 200 without input of a command to save the image data. The stored image data can be managed in association with image data displayed on the display device 300. Moreover, a recording medium, such as paper, much used for writing upon compared to an electronic tablet, and commonly used writing materials can be used, which facilitates input of commands, i.e., writing of the save-command character, etc. Furthermore, a scanner of an existing MFP used in offices, etc. can be used. Due to this, necessity to install new equipment is removed and initial costs can be reduced.

In the data-management process explained with reference to FIG. 7, only a process from extraction of a save-command character to save of the image data is explained. However, if another command character is obtained, a process is carried out according to another command content corresponding to the command character. For example, if a command character "D" is extracted from image data of a scanned document, corresponding command content is "discard data" (see FIG. 2), and the file server 200 deletes the image data from a file based on a management number received from the MFP 100. For another example, if a command character "S" is extracted from image data of a scanned document, corresponding command content is "transmit data by email" (see FIG. 2), and the MFP 100 transmits the image data subjected to the OCR process to a predetermined partner device.

According to the embodiment described above, the MFP 100 includes the scanner 130 that scans and reads a document. However, a scanning or reading device can be provided separately from the MFP 100. In such case, image data of a document read by the device is sent to the MFP 100, so that the MFP 100 can process the image data.

The MFP 100 includes the storage unit 121 that store therein images, and processors such as the reading processor 101 that controls the scanner 130 and the handwritten-data recognizing unit 102 that carry out OCR process, image analysis, etc. However, scanning of a document, OCR process, etc. can be performed on the file server 200. In such case, the file server 200 scans a document to obtain image data and carries out the OCR process, etc. on the image data, and the MFP 100 stores therein the image data.

Further, in the embodiment described above, the MFP 100 stores therein the command-data table (see FIG. 2), and the file server 200 stores therein the same command-data table and the management table (see FIG. 3). However, the command-data table and the management table can be stored in the MFP 100, and not in the file server 200. In such case, the MFP 100 searches command content of a read command character and saving destination, and transmits the command content and the saving destination together with read image data to the file server 200. The file server 200 carries out process for the image data. With this, the structure of the MFP 100 is simplified.

The MFP 100 that stores therein the command-data table and the management table can also function as the file server 200. In other words, the MFP 100 can search command content of a read command character and saving destination and store (manage) therein the command content and the saving destination without the file server 200.

Similarly, the command-data table and the management table can be stored in the file server 200, and not in the MFP 100. In such case, the MFP 100 transmits a command character and read image data to the file server 200. The file server 200 searches command content and saving destination, and carries out process such as saving process, etc.

In the embodiment described above, an enclosing mark and a command character written on a document are recognized through the OCR process and the image analyzing process to acquire a command for image data. However, a command for image data can also be acquired by carrying out the OCR process and the image analysis, etc. on a predetermined color written on a document.

Figure 8:
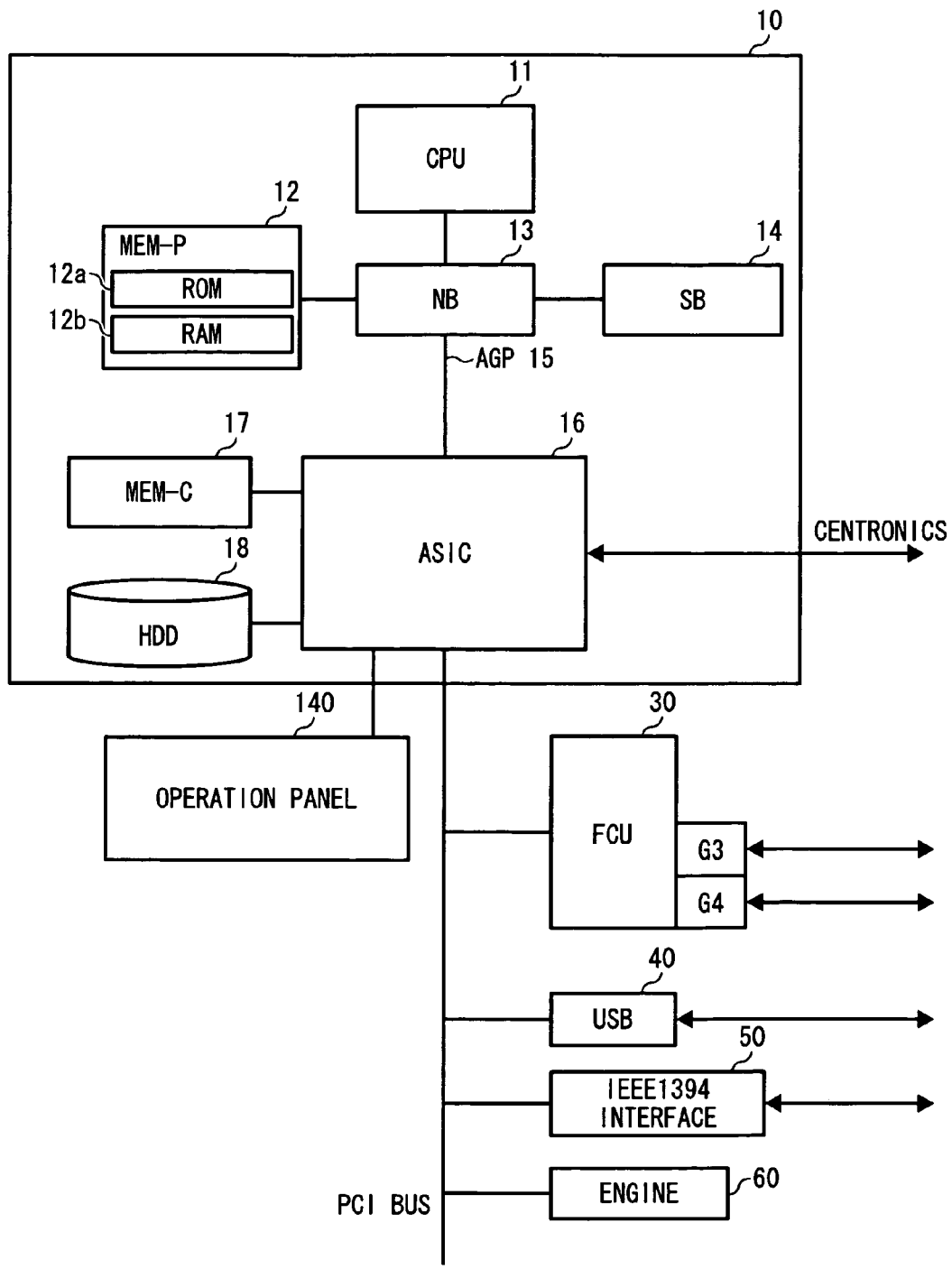
FIG. 8 is a block diagram of a hardware configuration of an MFP used as an image processing apparatus shown in FIG. 1.

FIG. 8 is a block diagram of a hardware configuration of the MFP 100. The MFP 100 includes a controller 10 and an engine 60 that are connected by a peripheral component interconnect (PCI) bus. The controller 10 controls imaging, communication, and input from an operating unit (not shown) in the MFP 100. The engine 60 is a printer engine that is connectable to the PCI bus. For example, the engine 60 is a monochrome plotter, a single-drum color plotter, a four-drum color plotter, a scanner, or a facsimile unit. In addition to an engine component such as a plotter, the engine 60 also includes an image-processing component such as an error diffuser or a gamma converter.

The controller 10 includes a central processing unit (CPU) 11, a north bridge (NB) 13, a system memory (MEM-P) 12, a south bridge (SB) 14, a local memory (MEM-C) 17, an application specific integrated circuit (ASIC) 16, and a hard disk drive (HDD) 18. The NB 13 and the ASIC 16 are connected by an accelerated graphics port (AGP) bus 15. The MEM-P 12 includes a read only memory (ROM) 12a and a random access memory (RAM) 12b.

The CPU 11 controls the MFP 100. The CPU 11 includes a chipset including the NB 13, the MEM-P 12, and the SB 14. The CPU 11 is connected to other components via the chipset.

The NB 13 is a bridge for connecting the MEM-P 12, the SB 14, and the AGP 15 to the CPU 11. The NB 13 includes a memory controller which controls read/write from/to the MEM-P 12, a PCI master, and an AGP target.

The MEM-P 12 is a system memory for storing computer programs and data, for loading the computer programs and the data, for storing print data to be printed by the printer, etc. The MEM-P 12 includes the ROM 12a and the RAM 12b. The ROM 12a stores therein the computer programs and the data. The computer programs and the data are loaded into the RAM 12b as required. The RAM 12b temporarily stores therein print data to be printed by the printer.

The SB 14 is a bridge for connecting the NB 13 to PCI devices, peripheral devices, etc. The SB 14 is connected to the NB 13 via a PCI bus. A network interface is also connected to the PCI bus.

The ASIC 16 is an image processing-specific integrated circuit (IC) that includes a hardware element for image processing. The ASIC 16 serves as a bridge to connect the AGP 15, the PCI bus, the HDD 18, and the MEM-C 17. The ASIC 16 includes a PCI target and an AGP master, an arbiter (ARB) that forms a core of the ASIC 16, a memory controller that controls the MEM-C 17, a plurality of direct memory access controllers (DMAC) that rotates image data by a hardware logic, and a PCI unit that carries out data transfer between the controller 10 and the engine 60 via the PCI bus. A fax control unit (FCU) 30, a universal serial bus (USB) 40, and an institute of electrical and electronic engineers 1394 (IEEE1394) interface 50 are connected to the ASIC 16 via the PCI bus. The operation panel 140 is directly connected to the ASIC 16.

The MEM-C 17 is a local memory used as an image buffer for copying and as a code buffer. The HDD 18 is used for storing image data, computer programs, font data, and forms.

The AGP 15 is a bus interface for a graphics accelerator card proposed for enhancing the speed of graphic process. The AGP 15 directly accesses the MEM-P 12 with high throughput, thereby enhancing the speed of the graphics accelerator card.

A computer program (hereinafter, "handwritten data-recognition program") executed on the MFP 100 is provided as being stored in a ROM, etc.

The handwritten data-recognition program can also be stored in a file of installable format or executable format in a computer readable recording medium such as a flexible disk (FD), a compact disk-read only memory (CD-ROM), a digital versatile disk (DVD).

The handwritten data-recognition program can also be stored in a computer connected to a network such as the Internet and downloaded therefrom via the network. The handwritten data-recognition program can also be provided or distributed via the network such as Internet.

The handwritten data-recognition program has a modular structure that includes the above constituent units (the reading processor 101, the character recognizing processor 103, the command extracting unit 104, the matching unit 105, the display-input processor 106, the image processor 107, the printing processor 108, and the transceiver 109). In the actual hardware configuration, the CPU (processor) loads the handwritten data-recognition program from the ROM into a main memory, and executes it to implement the constituent units on the main memory.

According to an embodiment of the present invention, a desired process can be carried out on image data of a document based on a character and a graphic handwritten on the document without input of a command for the image data. To be specific, the image data can be easily saved in a desired destination. Moreover, an existing image processing apparatus in an office, etc. can be used, and initial costs can be reduced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus, comprising:
    a storage unit that stores therein a first association table that contains a command character and content of a command corresponding to the command character in an associated manner;
    a recognizing unit that performs character recognition and image analysis on image data to extract handwritten information including a command graphic representing a command with respect to the image data and a command character handwritten near the command graphic; and a matching unit that matches the command character extracted by the recognizing unit with the command character in the first association table.

2. The image processing apparatus according to claim 1, wherein the command character in the first association table represents a command to store image data.

3. The image processing apparatus according to claim 2, wherein the recognizing unit includes
a character recognizing unit that performs first character recognition on the image data,
a command extracting unit that performs image analysis on an image area in the image data where the first character recognition has failed, and extracts the command graphic in the handwritten information,
the character recognizing unit performs second character recognition of an area near the command graphic to extract the command character.

4. The image processing apparatus according to claim 3, wherein
the command graphic is an enclosing mark handwritten in a nearly circular shape, and
the character recognizing unit performs the second character recognition of an area inside the enclosing mark to extract the command character.

5. The image processing apparatus according to claim 4, wherein
the storage unit further stores therein a second association table that contains management information indicating destination to store image data and the destination in an associated manner,
the character recognizing unit performs the second character recognition of an area inside and near the enclosing mark to extract the command character inside the enclosing mark and management information handwritten near the enclosing mark, and
the matching unit matches the management information extracted by the character recognizing unit with the management information in the second association table.

6. An image processing apparatus comprising:
a storage unit that stores therein a first association table that contains a command character and content of a command corresponding to the command character in an associated manner;
a character recognizing unit that performs first character recognition on image data;
a command extracting unit that performs image analysis on an image area in the image data where the first character recognition has failed, and extracts a command graphic representing a command with respect to the image data from handwritten information including the command graphic and a command character handwritten near the command graphic, the character recognizing unit performing second character recognition of an area near the command graphic to extract the command character from the handwritten information; and
a matching unit that matches the command character extracted by the character recognizing unit with the command character in the first association table.

7. The image processing apparatus according to claim 6, wherein the command character in the first association table represents a command to store image data.

8. The image processing apparatus according to claim 7, wherein
the command graphic is an enclosing mark handwritten in a nearly circular shape, and
the character recognizing unit performs the second character recognition of an area inside the enclosing mark to extract the command character.

9. The image processing apparatus according to claim 8, wherein
the storage unit further stores therein a second association table that contains management information indicating destination to store image data and the destination in an associated manner,
the character recognizing unit performs the second character recognition of an area inside and near the enclosing mark to extract the command character inside the enclosing mark and management information handwritten near the enclosing mark, and
the matching unit matches the management information extracted by the character recognizing unit with the management information in the second association table.

* * * * *